United States Patent
Xiao et al.

(10) Patent No.: US 11,753,056 B2
(45) Date of Patent: Sep. 12, 2023

(54) CLOUD PLATFORM-BASED COMPREHENSIVE LINE NETWORK MONITORING METHOD AND SYSTEM

(71) Applicants: PCI TECHNOLOGY & SERVICE CO., LTD., Guangdong (CN); GUANGZHOU HUAJIA SOFTWARE CO., LTD., Guangdong (CN); GUANGDONG HUAZHIYUAN TECHNOLOGY CO., LTD., Guangdong (CN); GUANGZHOU PCI URBAN RAIL TRANSIT SMART OPERATION & MAINTENANCE SERVICE CO., LTD., Guangdong (CN)

(72) Inventors: Xiong Xiao, Guangdong (CN); Jianping Jia, Guangdong (CN); Zhaohui Chen, Guangdong (CN)

(73) Assignees: PCI TECHNOLOGY & SERVICE CO., LTD., Guangdong (CN); GUANGHOU HUAJIA SOFTWARE CO., LTD., Guangdong (CN); GUANGDONG HUAZHIYUAN TECHNOLOGY CO., LTD., Guangdong (CN); GUANGZHOU PCI URBAN RAIL TRANSIT SMART OPERATION & MAINTENANCE SERVICE CO., LTD., Guangdong (CN)

( * ) Notice: Subject to any disclaimer, the term of this patent is extended or adjusted under 35 U.S.C. 154(b) by 0 days.

(21) Appl. No.: 18/185,334

(22) Filed: Mar. 16, 2023

(65) Prior Publication Data
US 2023/0219605 A1     Jul. 13, 2023

Related U.S. Application Data

(63) Continuation of application No. PCT/CN2021/118888, filed on Sep. 16, 2021.

(30) Foreign Application Priority Data

Dec. 14, 2020   (CN) .......................... 202011466920.4

(51) Int. Cl.
*B61L 27/70* (2022.01)
*G06F 16/23* (2019.01)

(52) U.S. Cl.
CPC .......... *B61L 27/70* (2022.01); *G06F 16/2358* (2019.01)

(58) Field of Classification Search
CPC ............................ B61L 27/70; G06F 16/2358
See application file for complete search history.

(56) References Cited

U.S. PATENT DOCUMENTS

| | | | |
|---|---|---|---|
| 2014/0337086 A1* | 11/2014 | Asenjo | G06F 3/0635 705/7.28 |
| 2018/0091439 A1 | 3/2018 | Zhang et al. | |
| 2021/0081271 A1* | 3/2021 | Doshi | G06F 11/0772 |

FOREIGN PATENT DOCUMENTS

| | | |
|---|---|---|
| CN | 103442055 A | 12/2013 |
| CN | 106790436 A | 5/2017 |

(Continued)

OTHER PUBLICATIONS

Fiore et al, S. An Integrated Big and Fast Data Analytics Platform for Smart Urban Transportation Management, Google Scholar, IEEE Access, vol. 7, Aug. 22, 2019, pp. 117652-117677. (Year: 2019).*

(Continued)

*Primary Examiner* — Russell Frejd

(57) ABSTRACT

Provided are a cloud platform-based comprehensive line network monitoring method and system. Device state data of each line is acquired, and stored in a monitoring platform and a data platform that are built on a cloud platform. The monitoring platform can only store only the latest device (Continued)

state data, perform data monitoring processing on the device state data to obtain real-time monitoring data, and transmit corresponding real-time monitoring data to a client at an application layer based on a data subscription demand of the client, to allow the client to perform real-time device monitoring processing based on the real-time monitoring data. Also, the data platform can provide, in response to a historical data application request sent by the client, the device state data to the client as historical statistical analysis data, to allow the client to perform historical state monitoring processing based on the historical statistical analysis data.

17 Claims, 6 Drawing Sheets

(56) References Cited

FOREIGN PATENT DOCUMENTS

| | | | |
|---|---|---|---|
| CN | 107807597 | A | 3/2018 |
| CN | 108725522 | A | 11/2018 |
| CN | 109474479 | A | 3/2019 |
| CN | 109739816 | A | 5/2019 |
| CN | 110278098 | A | 9/2019 |
| CN | 111737329 | A | 10/2020 |
| CN | 112017195 | A | 12/2020 |
| CN | 112073252 | A | 12/2020 |
| CN | 112600920 | A | 4/2021 |

OTHER PUBLICATIONS

Fu et al, J.-S. Smart Subway Information Platform based on Internet of Things, Google Scholar, International Journal of Hybrid Information Technology, vol. 6, No. 6, 2013, pp. 177-186. (Year: 2013).*
International Search Report dated Dec. 16, 2021 in International Application No. PCT/CN2021/118888. English translation attached.
First Office Action from corresponding Chinese Application No. 202011466920.4 , dated Feb. 25, 2022. English translation attached.
The Grant Notice from corresponding Chinese Application No. 202011466920.4, dated May 23, 2022. English translation attached.
Xiaodong Wei et al."Urban Rail Transit Intelligent Information Integration System" «Automation Panorama» CN11-2516/TP, 2016, vol. 12, Dec. 15, 2016, (Dec. 15, 2016).
Zhihai Cui "Talking About the Database of Urban Rail Transit Integrated Monitoring System" <«Installation» , 2017, vol. 8, Aug. 15, 2017, (Aug. 15, 2017).
Yunfan Wang et al."Data flow analysis of Shenyang Metro Line 9 integrated monitoring system" «SP» 11-5183/U, 2018, vol. 2, Feb. 15, 2018, (Feb. 15, 2018).
Zhixin Wang et al."Design of Big Data Platform for Energy Consumption of Urban Rail Transit Line Network", «Modern Urban Transit» CN 12-1276/TP, 2018, vol. 10, Oct. 20, 2018, (Oct. 20, 2018).
Si, Wu "Research on Data Flow Direction and Synchronization Method of Integrated Monitoring System of Metro" «Technology Innovation and Application» CN 23-1581/G3, 2019, vol. 13, Apr. 30, 2019, (Apr. 30, 2019).
Xiaodong Wei "Analysis of Key Issues in the Construction of Integrated Monitoring System of Subway" «Automation Panorama» CN11-2516/TP, 2019, vol. 5, May 15, 2019, (May 15, 2009).
HollySys "Urban rail transit integrated monitoring system solution based on the "converged cloud platform" at the line network level" «Automation Panorama» CN11-2516/TP, 2020, vol. 9, Sep. 15, 2020, (Sep. 15, 2020).
Shinan Tang et al. "Integrated Supervision Control System Scheme of Urban Rail Transit Based on Cloud Platform" «Urban Mass Transit» CN:31-1749/U, 2020, vol. 5, May 10, 2020, (May 10, 2020).
Jianwen Wang et al. "Practical Project of Road Conditions System on Xiamen Metro Line 1" «Urban Rapid Rail Transit» CN:11-5144/U, 2018, vol. 4, Aug. 18, 2018, (Aug. 18, 2018).
Yu Zhang et al. "Optimization of turnout safety monitoring system based on MQTT protocol" «Modern Urban Transit» , 2020, vol. 4, Apr. 15, 2020, (Apr. 15, 2020).

* cited by examiner

CLOUD PLATFORM-BASED COMPREHENSIVE LINE NETWORK MONITORING METHOD AND SYSTEM

CROSS-REFERENCE TO RELATED APPLICATIONS

This application is a continuation of International Application No. PCT/CN2021/118888, filed on Sep. 16, 2021, which claims priority to Chinese Patent Application No. 202011466920.4 filed on Dec. 14, 2020, the entire disclosure of which is incorporated herein by reference.

FIELD

Embodiments of the present disclosure relate to the field of urban rail transit monitoring, and more particularly, to a cloud platform-based comprehensive line network monitoring method and system.

BACKGROUND

At present, most of urban rail transit line network command center systems are constructed in a mode of deployment and construction on a physical machine. That is, each of a comprehensive line monitoring system and a comprehensive line network monitoring system is constructed in an information silo manner.

In a conventional construction mode, historical monitoring data of a same line would be stored in both a line and a line network. In terms of construction cycles, the line comprehensive monitoring system is constructed before the comprehensive line network monitoring system. Access and application of data of the line comprehensive monitoring system that has been constructed but not yet accessed to a line network platform are carried out in the construction cycle of each comprehensive line network monitoring system. The long-term development of urban rail transit has stimulated information silo construction of a number of line network platforms, leading to a serious problem of data isolated island.

SUMMARY

Embodiments of the present disclosure provide a cloud platform-based comprehensive line network monitoring method and system to realize resource sharing and solving a problem of isolated data island.

In a first aspect, an embodiment of the present disclosure provides a cloud platform-based comprehensive line network monitoring method. The cloud platform-based comprehensive line network monitoring method includes: acquiring device state data of each line and storing the device state data in a monitoring platform and a data platform; performing data monitoring processing on the device state data based on the monitoring platform to obtain real-time monitoring data; providing the real-time monitoring data to a client based on a data subscription demand of the client, to allow the client to perform real-time device monitoring processing based on the real-time monitoring data; and providing, in response to a historical data application request sent by the client, the device state data to the client as historical statistical analysis data, to allow the client to perform historical state monitoring processing based on the historical statistical analysis data.

Further, the acquiring the device state data of each line and storing the device state data in the monitoring platform and the data platform includes: acquiring, based on a new line, device state data of the new line in real time via an interface server, storing the device state data of the new line into a Remote Dictionary Server (Redis) database of the monitoring platform, and pushing device state data of a line center and device state data of a station depot and stabling yard to the data platform via a message queue service for acquisition and storage; and acquiring, based on an existing line, device state data of the existing line via the interface server, storing the device state data of the existing line into the Redis database of the monitoring platform, and transmitting the device state data of the existing line to the data platform by the monitoring platform via the message queue service, to allow the data platform to acquire and store the device state data of the existing line.

Further, the performing data monitoring processing on the device state data based on the monitoring platform to obtain the real-time monitoring data includes: detecting a set event in a Remote Dictionary Server (Redis) database based on the monitoring platform based on the device state data to obtain a device state change.

Further, the providing the real-time monitoring data to the client based on the data subscription demand of the client, to allow the client to perform the real-time device monitoring processing based on the real-time monitoring data includes: determining point state change of each data point based on device state change; determining, in response to the point state change, a client subscribing to the data point based on a correspondence between the client and the subscribed data point; and pushing real-time monitoring data corresponding to the data point to the client through the monitoring platform, to allow the client to perform the real-time device monitoring processing based on the real-time monitoring data.

Further, the providing, in response to the historical data application request sent by the client, the device state data to the client as the historical statistical analysis data, to allow the client to perform the historical state monitoring processing based on the historical statistical analysis data includes: determining, in response to the historical data application request sent by the client, a data point corresponding to the historical data application request; and pushing device state data corresponding to the data point to the client as the historical statistical analysis data through the data platform, to allow the client to perform the historical state monitoring processing based on the historical statistical analysis data.

Further, the cloud platform-based comprehensive line network monitoring method further includes, subsequent to acquiring the device state data of each line and storing the device state data in the monitoring platform and the data platform: performing, in response to a device control request sent by the client, permission verification on a control permission of the client on a target subsystem, the device control request carrying a control instruction for the target subsystem; and transmitting corresponding control instruction to the target subsystem based on success of the permission verification of the client, to enable the target subsystem to perform a device control operation based on the control instruction.

Further, the transmitting the corresponding control instruction to the target subsystem based on the success of the permission verification of the client includes: determining, based on the success of the permission verification of the client, a station-level comprehensive monitoring system where the target subsystem is located; and transmitting, via an interface server, the control instruction to the station-level comprehensive monitoring system based on the monitoring platform, to enable the station-level comprehensive monitoring system to transmit the control instruction to the target subsystem through a station-level interface processor.

Further, the monitoring platform is configured to provide monitoring capability services and a discipline agent services, the monitoring capability services including data aggregation, real-time data processing, data synchronization, device control, alarm processing, event processing, message notification, permission control, and memory database; and data services provided by the data platform include data aggregation, data analysis, data sharing, statistical analysis, operation and maintenance monitoring, Massive Parallel Processing (MPP) database, Hadoop Database (HBase), and Kafka message queue.

Further, the monitoring platform is further configured to provide an ICE-GateWay service, the ICE-GateWay service being a communication interface between the monitoring capability service and the client.

In a second aspect, an embodiment of the present disclosure provides a cloud platform-based comprehensive line network monitoring apparatus. The cloud platform-based comprehensive line network monitoring apparatus includes: a data acquisition module configured to acquire device state data of each line and store the device state data in a monitoring platform and a data platform; a monitoring processing module configured to perform data monitoring processing on the device state data based on the monitoring platform to obtain real-time monitoring data; a real-time feedback module configured to provide the real-time monitoring data to a client based on a data subscription demand of the client, to allow the client to perform real-time device monitoring processing based on the real-time monitoring data; and a historical statistical analysis module configured to provide, in response to a historical data application request sent by the client, the device state data to the client as historical statistical analysis data, to allow the client to perform historical state monitoring processing based on the historical statistical analysis data.

Further, the data acquisition module is specifically configured to: acquire, based on a new line, device state data of the new line in real time via an interface server, storing the device state data of the new line into a Remote Dictionary Server (Redis) database of the monitoring platform, and pushing device state data of a line center and device state data of a station depot and stabling yard to the data platform via a message queue service for acquisition and storage; and acquire, based on an existing line, device state data of the existing line via the interface server, storing the device state data of the existing line into the Redis database of the monitoring platform, and transmitting the device state data of the existing line to the data platform by the monitoring platform via the message queue service, to allow the data platform to acquire and store the device state data of the existing line.

Further, the monitoring processing module is specifically configured to detect a set event in a Remote Dictionary Server (Redis) database based on the monitoring platform based on the device state data to obtain a device state change.

Further, the real-time feedback module is specifically configured to: determine point state change of each data point based on device state change; determine, in response to the point state change, a client subscribing to the data point based on a correspondence between the client and the subscribed data point; and push real-time monitoring data corresponding to the data point to the client through the monitoring platform, to allow the client to perform the real-time device monitoring processing based on the real-time monitoring data.

Further, the historical statistical analysis module is specifically configured to: determine, in response to the historical data application request sent by the client, a data point corresponding to the historical data application request; and push device state data corresponding to the data point to the client as the historical statistical analysis data through the data platform, to allow the client to perform the historical state monitoring processing based on the historical statistical analysis data.

Further, the apparatus further includes a device control module. The device control module is configured to: perform, in response to a device control request sent by the client, permission verification on a control permission of the client on a target subsystem, the device control request carrying a control instruction for the target subsystem; and transmit corresponding control instruction to the target subsystem based on success of the permission verification of the client, to enable the target subsystem to perform a device control operation based on the control instruction.

Further, the device control module transmitting the corresponding control instruction to the target subsystem based on the success of the permission verification of the client includes: determining, based on the success of the permission verification of the client, a station-level comprehensive monitoring system where the target subsystem is located; and transmitting, via an interface server, the control instruction to the station-level comprehensive monitoring system based on the monitoring platform, to enable the station-level comprehensive monitoring system to transmit the control instruction to the target subsystem through a station-level interface processor.

Further, the monitoring platform is configured to provide monitoring capability services and a discipline agent services, the monitoring capability services including data aggregation, real-time data processing, data synchronization, device control, alarm processing, event processing, message notification, permission control, and memory database; and data services provided by the data platform include data aggregation, data analysis, data sharing, statistical analysis, operation and maintenance monitoring, Massive Parallel Processing (MPP) database, Hadoop Database (HBase), and Kafka message queue.

Further, the monitoring platform is further configured to provide an ICE-GateWay service, the ICE-GateWay service being a communication interface between the monitoring capability service and the client.

In a third aspect, an embodiment of the present disclosure provides a cloud platform-based comprehensive line network monitoring system, including: a monitoring platform and a data platform that are provided on a cloud platform; a line network-level monitoring system provided at a line network center; a newly-added central-level system provided at a line center; and a newly-added station-level system provided at a station, depot and stabling yard. Each of the line network-level monitoring system, the newly-added central-level system, and the newly-added station-level system is communicatively connected to the monitoring platform and the data platform. Device state data of the line center is acquired by a central comprehensive monitoring system via a central interface processor. Device state data of the station depot and stabling yard is acquired by a station-level comprehensive monitoring system via a station-level interface processor. The monitoring platform is configured to: acquire and store the device state data and perform a data monitoring processing on the device state data to obtain real-time monitoring data; and provide the real-time monitoring data to a client based on a data subscription demand of the client to allow the client to perform real-time device monitoring processing based on the real-time monitoring data. The data platform is configured to provide, in response to a historical data application request sent by the client, the device state data to the client as historical statistical analysis data to allow the client to perform historical state monitoring processing based on the historical statistical analysis data.

Further, an interface server is provided at the line center. Each of the central comprehensive monitoring system and the station-level comprehensive monitoring system is communicatively connected to the monitoring platform via the interface server. For a new line, device state data of the central comprehensive monitoring system and the station-level comprehensive monitoring system is acquired by the monitoring platform via the interface server, and is stored into a Remote Dictionary Server (Redis) database of the monitoring platform, and the acquired device state data is pushed to a message queue of the data platform by the central comprehensive monitoring system and the station-level comprehensive monitoring system via a message queue service for acquisition and storage. For an existing line, the device state data of the central comprehensive monitoring system and the station-level comprehensive monitoring system is acquired by the monitoring platform via the interface server, and is stored into the Redis database of the monitoring platform, and the device state data is transmitted to the data platform by the monitoring platform via the message queue service to allow the data platform to acquire and store the device state data.

In a fourth aspect, an embodiment of the present disclosure provides a computer device, including a memory having one or more programs stored thereon, and one or more processors. The one or more programs, when executed by the one or more processors, cause the one or more processors to implement the cloud platform-based comprehensive line network monitoring method as described in the first aspect of the present disclosure.

In a fifth aspect, an embodiment of the present disclosure provides a storage medium including computer-executable instructions. The computer-executable instructions, when executed by a computer processor, perform the cloud platform-based comprehensive line network monitoring method as described in the first aspect of the present disclosure.

According to the embodiments of the present disclosure, the device state data of each line is acquired, and stored in the monitoring platform and the data platform that are built on the cloud platform. The monitoring platform can only store the latest device state data, perform the data monitoring processing on the device state data to obtain the real-time monitoring data, and transmit corresponding real-time monitoring data to the client at an application layer based on the data subscription demand of the client, to allow the client to perform the real-time device monitoring processing based on the real-time monitoring data. Also, the data platform can provide, in response to the historical data application request sent by the client, the device state data to the client as the historical statistical analysis data, to allow the client to perform the historical state monitoring processing based on the historical statistical analysis data. Unified processing and storage of the device state data of the line center and the device state data of the station depot and stabling yard are realized by the monitoring platform and the data platform on the cloud platform, effectively improving resource utilization to facilitate rapid service deployment and expansion, and realizing resource sharing and unified management and control to solve the problem of isolated data island.

DETAILED DESCRIPTION

In order to make the objects, technical solutions, and advantages of the present disclosure more apparent, specific embodiments of the present disclosure will be described in further detail below with reference to the accompanying drawings. It should be understood that the specific embodiments described here are only used to explain, rather than limiting, the present disclosure. In addition, it should be noted that for ease of description, the accompanying drawings illustrate only some, rather than all, of the contents relevant to the present disclosure. Before discussion of exemplary embodiments in more detail, it should be mentioned that some of the exemplary embodiments are described as processes or methods described as flowcharts. Although operations (or steps) are illustrated as a sequential processing in each flowchart, some of the operations thereof may be performed in parallel, concurrently, or simultaneously. In addition, the order of the operations may be rearranged. Although the processing may be terminated when its operations are completed, the processing may further have additional steps not included in the accompanying drawings. The processing may correspond to a method, a function, a procedure, a subroutine, a subprogram, etc.

Figure 1:
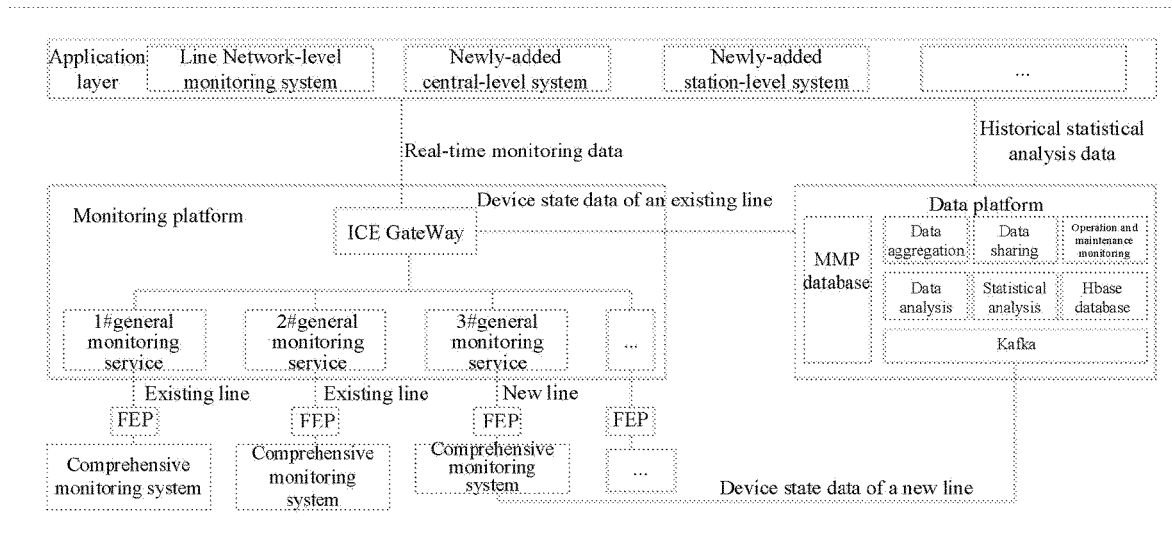
FIG. 1 is a schematic diagram of a system architecture of a cloud platform-based comprehensive line network monitoring system according to an embodiment of the present disclosure.

FIG. 1 illustrates a schematic diagram of a system architecture of a cloud platform-based comprehensive line network monitoring system according to an embodiment of the present disclosure. As illustrated in FIG. 1, the cloud platform-based comprehensive line network monitoring system includes a monitoring platform and a data platform that are provided on a cloud platform, a line network-level monitoring system provided at a line network center, a newly-added central-level system provided at a line center, and a newly-added station-level system provided at a station depot and stabling yard. Both the monitoring platform and the data platform are built on a PaaS layer of the cloud platform.

Each of the line network-level monitoring system, the newly-added central-level system, and the newly-added station-level system is communicatively connected to the monitoring platform and the data platform.

A comprehensive monitoring system (including a central comprehensive monitoring system and a station-level comprehensive monitoring system) is provided at the line center and the station depot and stabling yard. The comprehensive monitoring system is communicatively connected to the monitoring platform by an interface server (FEP). In addition, the comprehensive monitoring system is configured to acquire device state data of the line center and device state data of the station depot and stabling yard through a central interface processor and a station-level interface processor, respectively. The device state data includes data of all disciplines integrated or interconnected by the line center and the station depot and stabling yard (the station, the depot, and the stabling yard).

In some embodiments, central interface processors are provided at the line center and communicatively connected to each other based on ModBus protocol. A central comprehensive monitoring system of a new line is configured to regularly poll and obtain device state data of a central integrated and interconnected subsystem by the central interface processor, and transmit the device state data of the central integrated and interconnected subsystem to the monitoring platform via the interface server (FEP in FIG. 1) and to the data platform. A central comprehensive monitoring system of an existing line is configured to regularly poll and obtain the device state data of the central integrated and interconnected subsystem through the central interface processor, and transmit the obtained device state data of the central integrated and interconnected subsystem to the monitoring platform via the interface server, and the acquired device state data is forwarded to the data platform by the monitoring platform.

Further, the station-level comprehensive monitoring system according to the embodiments is configured to acquire device state data of the station depot and stabling yard through the station-level interface processor. In some embodiments, station-level interface processors are provided at the station depot and stabling yard and communicatively connected to each other based on the ModBus protocol. A station-level comprehensive monitoring system of the new line is configured to regularly poll and obtain device state data of a station-level integrated and interconnected subsystem through the station-level interface processor, and transmit the device state data of the station-level integrated and interconnected subsystem to the monitoring platform via the interface server and to the data platform. A station-level comprehensive monitoring system of the existing line is configured to regularly poll and obtain the device state data of the station-level integrated and interconnected subsystem through the station-level interface processor, and transmit the obtained device state data of the station-level integrated and interconnected subsystem to the monitoring platform via the interface server, and the acquired device state data is forwarded to the data platform by the monitoring platform.

In some embodiments, the monitoring platform is configured to acquire and store device state data uploaded by the comprehensive monitoring system, perform data monitoring processing on the device state data to obtain real-time monitoring data, and provide the real-time monitoring data to a client based on a data subscription demand of the client to allow the client to perform real-time device monitoring processing based on the real-time monitoring data. A manner in which the real-time device monitoring processing is performed on the real-time monitoring data by the client may be to display the real-time monitoring data and a device state change reflected by the real-time monitoring data.

Figure 2:
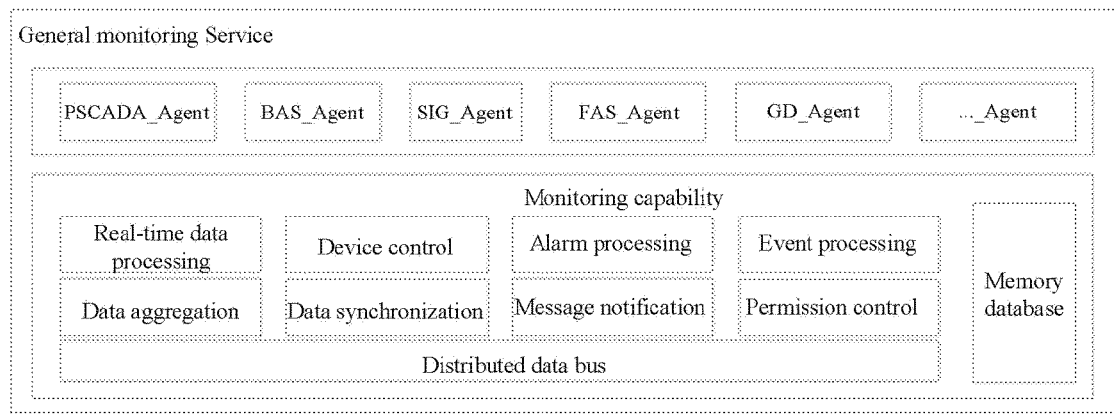
FIG. 2 is a schematic diagram of a monitoring service provided by a monitoring platform according to an embodiment of the present disclosure.

FIG. 2 is a schematic diagram of a monitoring service provided by a monitoring platform according to an embodiment of the present disclosure. As illustrated in FIG. 2, monitoring services provided by the monitoring platform include a monitoring capability service and a discipline agent service. The monitoring capability service includes data aggregation, real-time data processing, data synchronization, device control, alarm processing, event processing, message notification, permission control, memory database, and distributed data bus. The discipline agent service includes a Power Supervision Control And Data Acquisition (PSCADA) agent, a Building Automation System (BAS) agent, a Signaling (SIG) agent, a Fire Alarm System (FAS) agent, a rail system (GD) agent, and the like. The monitoring platform is capable of perform the data monitoring processing based on the monitoring capability service to obtain the real-time monitoring data.

The client includes a line network-level monitoring system client, a newly-added central-level system client, and a newly-added station-level system client, which use, based on the PaaS layer, services provided by the line network-level monitoring system, the newly-added central-level system, and the newly-added station-level system, respectively.

The data platform is configured to provide, in response to a historical data application request sent by the client, device state data corresponding to the historical data application request to the client as historical statistical analysis data, to allow the client to perform a historical state monitoring processing based on the historical statistical analysis data. The data platform is capable of provide an interface for a data access to allow an application layer to obtain relevant historical statistical analysis data. A manner in which the historical state monitoring processing is performed by the client based on the historical statistical analysis data may be to plot change curve based on time information of the historical statistical analysis data and display the change curve.

Data services provided by the data platform includes data aggregation, data analysis, data sharing, statistical analysis, operation and maintenance monitoring, Massive Parallel Processing (MPP) database, Hadoop Database (HBase), and Kafka message queue. The data platform is configured to perform data processing on the device state data based on corresponding data service.

The data service of data aggregation is mainly used to obtain required raw data from a peripheral data source, acquire data by different data access and exchange means based on different sources and types of the data, classify and process the data through data sorting and loading, and finally provide the data to upper layer storage.

The data service of data analysis is used to drag different data processing units into a directed acyclic graph by a visual development tool according to business needs to form a computing flowchart usable for a batch processing and a flow processing of big data, and establish a computing task with a task scheduling capability based on the computing process.

The data service of data sharing is used to provide management such as data acquisition and distribution with various other systems, support data service manners such as data, files, messages, and Application Programming Interfaces (APIs), and allow querying of data within an authorization range according to permissions.

The data service of statistical analysis is used to mainly build a data analysis model and a personalized self-service analysis instrument simply and efficiently based on visualization technology, and complete distributed statistical analysis of data, data mining, report production, and other tasks.

The data service of operation and maintenance monitoring includes task monitoring, operation and maintenance monitoring, and access monitoring. The task monitoring is used to monitor an execution state of computing tasks in a system. The operation and maintenance monitoring is used to monitor online/offline states of cluster nodes and data sources. The access monitoring can monitor, e.g., an access situation of a platform.

Further, the interface server (FEP in FIG. 1) is provided at the line center, and may be specifically a Comprehensive Operation Coordination Center (COCC) interface server. The interface server is connected to the distributed data bus of the monitoring platform via a bus. Each central comprehensive monitoring system corresponds to one interface server. The interface server is communicatively connected to the central comprehensive monitoring system based on the ModBus protocol and to the monitoring platform based on Interactive Connectivity Establishment (ICE) protocol.

Also, the monitoring platform is capable of providing an ICE-GateWay service, which serves as a communication interface between the monitoring capability and discipline agent services and the client. The client is accessed to a monitoring capability service and a discipline agent service of a certain line through ICE-GateWay. The ICE-GateWay service, which serves as an ICE real-time communication gateway, can provide a data request service guaranteeing hard real-time performance, and has functions such as security authentication, authorization, load balancing, service routing, subscription/publishing, and data aggregation.

In some embodiments, for the newly-added line and the existing line, connections of the comprehensive monitoring system (including the central comprehensive monitoring system at the line center and the station-level comprehensive monitoring system at the station depot and stabling yard) to the monitoring platform and the data platform are designed separately.

Figure 3:
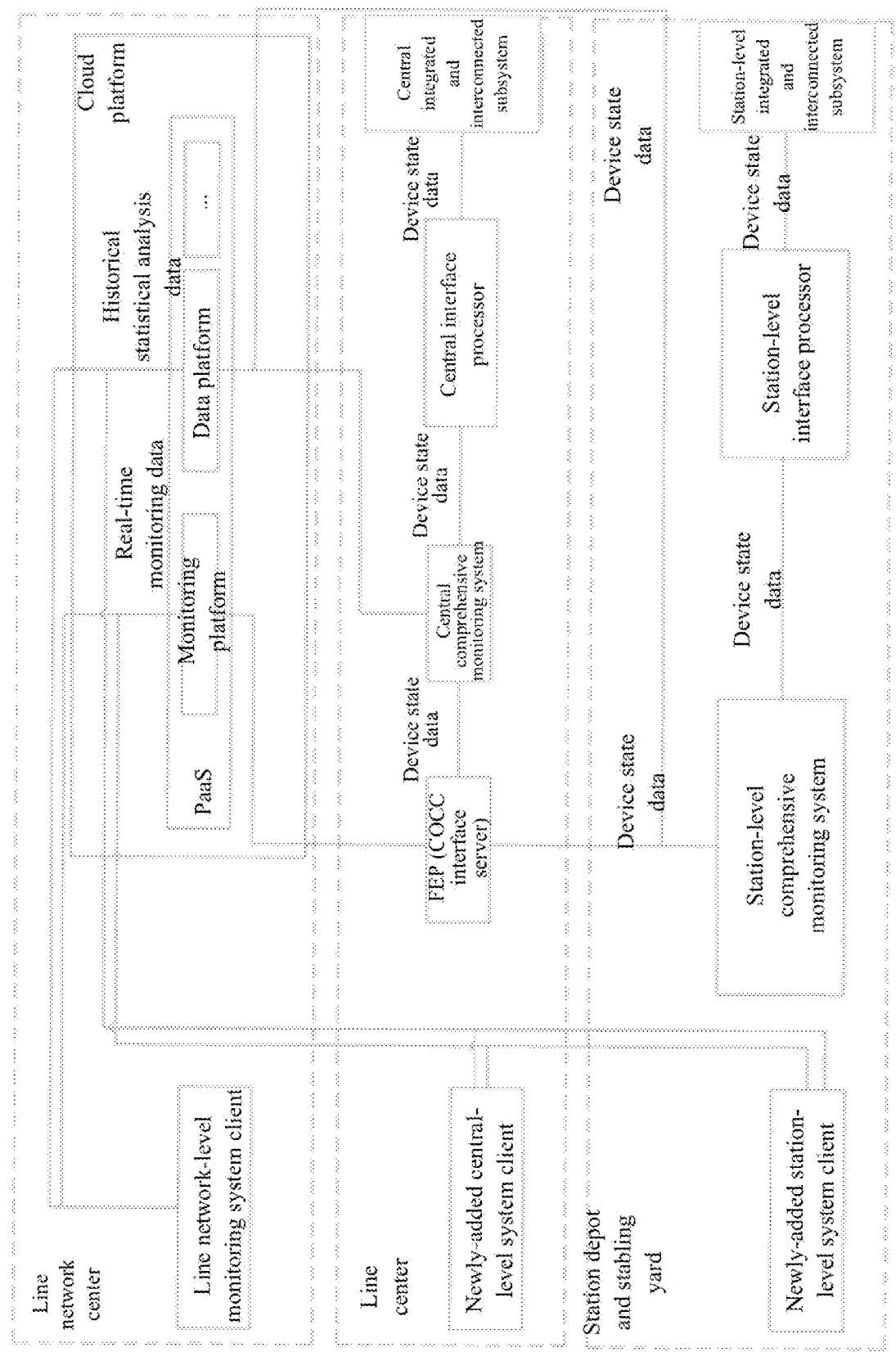
FIG. 3 is a schematic diagram of a system architecture of a comprehensive line network monitoring system of a new line according to an embodiment of the present disclosure.

FIG. 3 is a schematic diagram of a system architecture of a comprehensive line network monitoring system of a new line according to an embodiment of the present disclosure. In combination with FIG. 1 and FIG. 3, for the new line, device state data of the central comprehensive monitoring system and device state data of the station-level comprehensive monitoring system are acquired by the monitoring platform via the interface server, and is transmitted to the monitoring platform via the interface server to be stored into a Remote Dictionary Server (Redis) database of the monitoring platform (the monitoring platform uses a Redis memory database technology to process the acquired device state data in real time to form basic data such as events, alarms, and state changes). The acquired device state data is pushed to the data platform by the central comprehensive monitoring system and the station-level comprehensive monitoring system, and is processed and stored by a message queue service of the data platform, e.g., a flow or batch processing is performed on the device state data by the data platform via the message queue service such as a Kafka message queue and an offline file, and an analysis result of the data is stored in MPP or HBase database. The new line may be interpreted as a line that has not completed line construction, or a line that has completed line construction but has neither completed setup of the comprehensive monitoring system nor been put into service.

Figure 4:
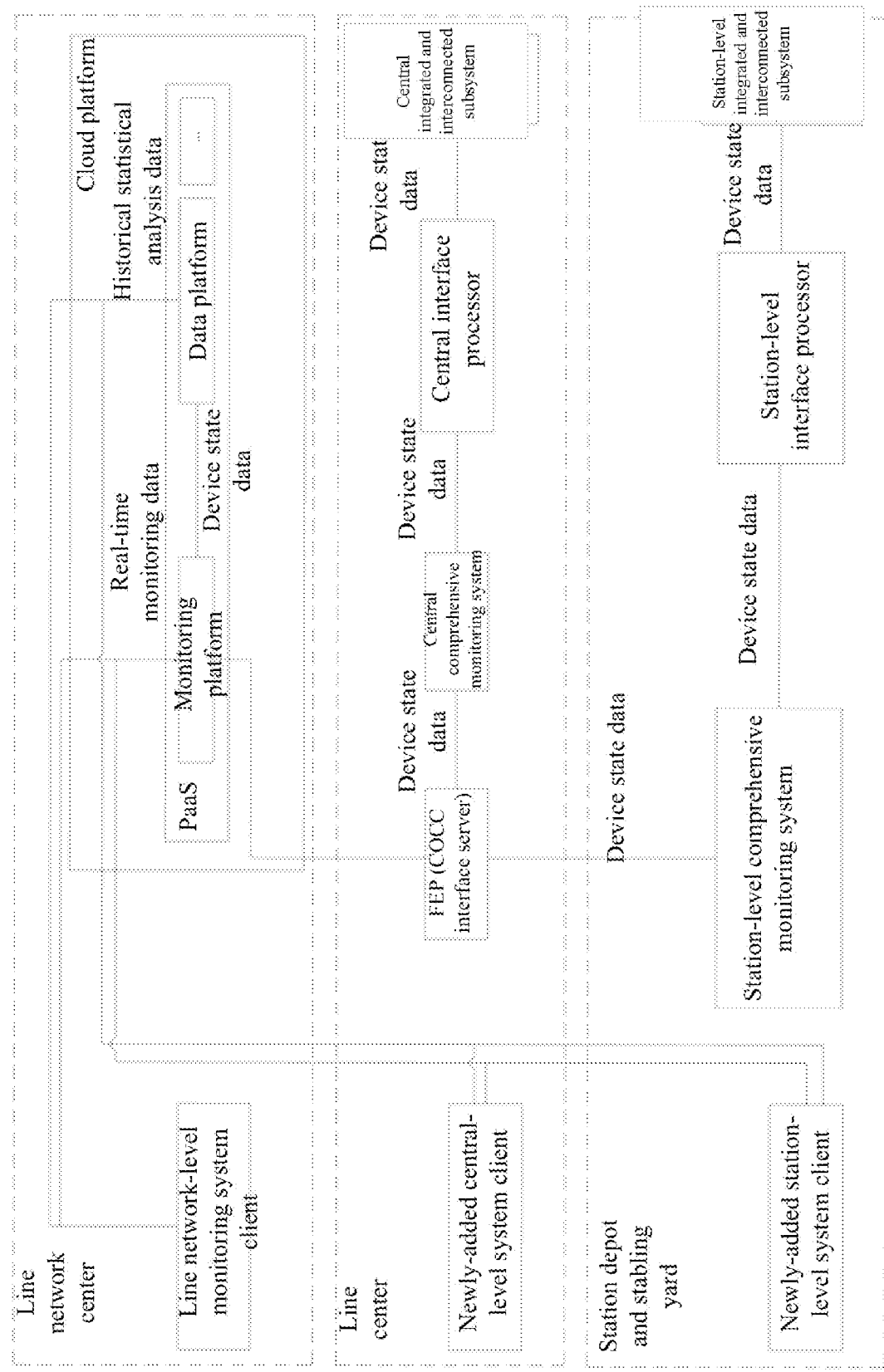
FIG. 4 is a schematic diagram of a system architecture of a comprehensive line network monitoring system of an existing line according to an embodiment of the present disclosure.

FIG. 4 is a schematic diagram of a system architecture of a comprehensive line network monitoring system of an existing line according to an embodiment of the present disclosure. In combination with FIG. 1 and FIG. 4, for the existing line, the device state data of the central comprehensive monitoring system and the device state data of the station-level comprehensive monitoring system are acquired by the monitoring platform via the interface server, and is transmitted to the monitoring platform via the interface server to be stored in the Redis database of the monitoring platform. In addition, the device state data is transmitted to the data platform by the monitoring platform via the message queue service to allow the monitoring platform to acquire and store the device state data.

As described above, the device state data of each line is acquired, and stored in the monitoring platform and the data platform that are built on the cloud platform. Further, the monitoring platform can only store the latest device state data, perform the data monitoring processing on the device state data to obtain the real-time monitoring data, and transmit corresponding real-time monitoring data to the client at an application layer based on the data subscription demand of the client to allow the client to perform the real-time device monitoring processing based on the real-time monitoring data. Also, the data platform can provide, in response to the historical data application request sent by the client, the device state data to the client as the historical statistical analysis data, to allow the client to perform the historical state monitoring processing based on the historical statistical analysis data. Unified processing and storage of the device state data at the line center and the device state data at the station depot and stabling yard can be realized by the monitoring platform and the data platform on the cloud platform, effectively improving resource utilization to facilitate rapid service deployment and expansion, and realizing resource sharing and unified management and control to solve the problem of isolated data island.

Figure 5:
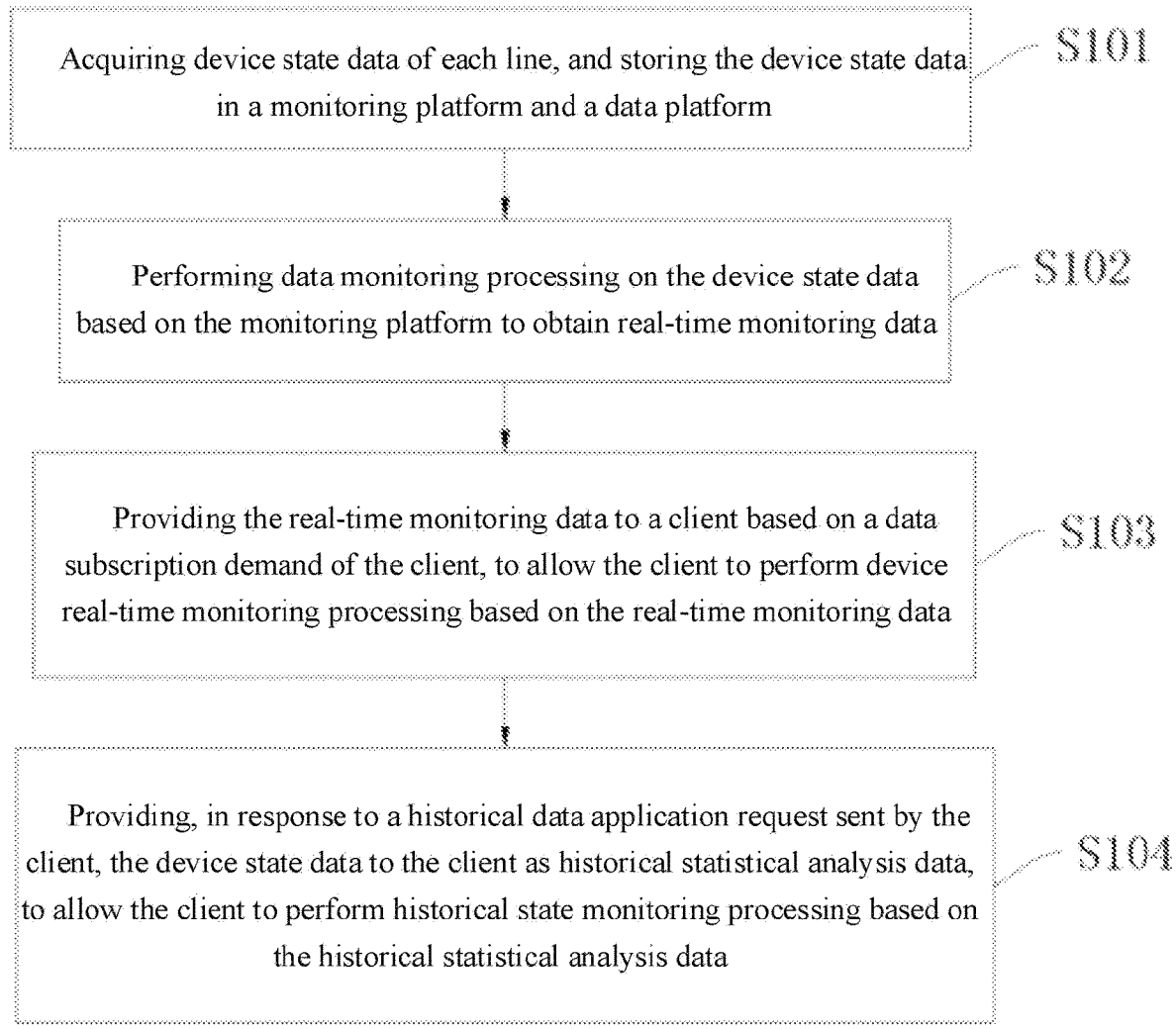
FIG. 5 is a flowchart of a cloud platform-based comprehensive line network monitoring method according to an embodiment of the present disclosure.

FIG. 5 illustrates a flowchart of a cloud platform-based comprehensive line network monitoring method according to an embodiment of the present disclosure, which can be applied in the cloud platform-based comprehensive line network monitoring system according to the above embodiments and can be performed by a cloud platform-based comprehensive line network monitoring apparatus. The cloud platform-based comprehensive line network monitoring apparatus may be implemented by means of hardware and/or software and integrated in a computer device.

Description will be made below taking the cloud platform-based comprehensive line network monitoring apparatus performing the cloud platform-based comprehensive line network monitoring method as an example. Referring to FIG. 5, the cloud platform-based comprehensive line network monitoring method includes actions at S101 to S104.

At S101, device state data of each line is acquired, and stored in a monitoring platform and a data platform.

The device state data includes data of all disciplines integrated or interconnected by a line center and a station depot and stabling yard (station, depot, stabling yard).

Device state data of the line center is polled from each integrated and interconnected subsystem by the central comprehensive monitoring system polls via the central interface processor at the line center using ModBus protocol.

Device state data of new line at the line center is transmitted to an interface server and a data platform by the central comprehensive monitoring system. The acquired device state data is stored by the data platform. After acquired by the interface server, the device state data is stored in a Remote Dictionary Server (Redis) cache database of the monitoring platform by the interface processor based on the station and the discipline via the ICE protocol. The Redis cache database can only store the latest device state data. For the existing line at the line center, the device state data is transmitted to the interface server by the central comprehensive monitoring system. After acquired by the interface server, the device state data is stored in the Redis cache database of the monitoring platform by the interface processor based on the station and the discipline via the ICE protocol, and is then forwarded to the data platform by the monitoring platform for storage.

Device state data of the station depot and stabling yard is polled from each integrated and interconnected subsystem by the station-level comprehensive monitoring system at the station depot and stabling yard via the station-level interface processor using the ModBus protocol.

For the new line at the station depot and stabling yard, the device state data is transmitted to the interface server and the data platform by the station-level comprehensive monitoring system transmits. The acquired device state data is stored by the data platform. After acquired by the interface server, the device state data is stored in the Redis cache database of the monitoring platform by the interface processor based on the station and the discipline via the ICE protocol. For the existing line at the station depot and stabling yard, the device state data is transmitted to the interface server by the station-level comprehensive monitoring system. After acquired by the interface server, the device state data is stored in the Redis cache database of the monitoring platform by the interface processor based on the station and the discipline via the ICE protocol, and then is forwarded to the data platform by the monitoring platform for storage.

At S102, data monitoring processing is performed on the device state data based on the monitoring platform to obtain real-time monitoring data.

For example, after received and stored by the monitoring platform, the data monitoring processing is performed on the device state data by the monitoring platform based on monitoring capability and discipline agent services provided by the monitoring platform, to obtain the real-time monitoring data. For example, real-time monitoring data for reflecting device state change is obtained based on device state data change.

At S103, the real-time monitoring data is provided to a client based on data subscription demand of the client to allow the client to perform real-time device monitoring processing based on the real-time monitoring data.

The data subscription demand may be to obtain the real-time monitoring data based on a set time interval or time point, or to obtain corresponding real-time monitoring data in response to the device state change reflected by the real-time monitoring data.

For example, a persistent connection is established between the client and the monitoring platform, and the client can subscribe to corresponding real-time monitoring data from the monitoring platform based on the data subscription demand. The corresponding real-time monitoring data is pushed to the client by the monitoring platform when time or the device state change satisfies the data subscription demand. A communication protocol used for establishing the persistent connection between the client and the monitoring platform may be determined based on a type of the client. For example, when a web end is used as the client, Web Socket protocol may be used to establish the persistent connection. Other types of clients may establish the persistent connection based on the ICE protocol.

Further, after the real-time monitoring data is received by the client, the real-time device monitoring processing is performed by the client based on the real-time monitoring data. For example, a device with a state change is determined based on the real-time monitoring data, and a condition of the state change of the device is displayed (for example, a device display mode on a device management interface or an operation mode of a device state indicator light is changed), to facilitate understanding of change of an operation state of the device by an operator.

At S104, the device state data is provided to the client as historical statistical analysis data in response to a historical data application request sent by the client, to allow the client to perform a historical state monitoring processing based on the historical statistical analysis data.

For example, when the client needs to observe and analyze a historical state of the device, the historical data application request is sent to the data platform by the client based on a time period to be observed and a target device. After the historical data application request is received by the data platform, the data platform determines, based on a time period corresponding to the historical data application request and the target device, device state data needed to be retrieve by the client as the historical statistical analysis data, and pushes the device state data to the client. The historical state monitoring processing may be performed by the client based on the received historical statistical analysis data. For example, the change curve is plotted based on time information of the historical statistical analysis data and is displayed.

As described above, the device state data of each line is acquired, and stored in the monitoring platform and the data platform that are built on the cloud platform. Further, the monitoring platform can only store the latest device state data, perform the data monitoring processing on the device state data to obtain the real-time monitoring data, and transmit corresponding real-time monitoring data to the client at an application layer based on the data subscription demand of the client to allow the client to perform the real-time device monitoring processing based on the real-time monitoring data. Also, the data platform can provide, in response to the historical data application request sent by the client, the device state data to the client as the historical statistical analysis data, to allow the client to perform the historical state monitoring processing based on the historical statistical analysis data. Unified processing and storage of the device state data at the line center and the device state data at the station depot and stabling yard can be realized by the monitoring platform and the data platform on the cloud platform, effectively improving resource utilization to facilitate rapid service deployment and expansion, and realizing resource sharing and unified management and control to solve the problem of isolated data island.

Figure 6:
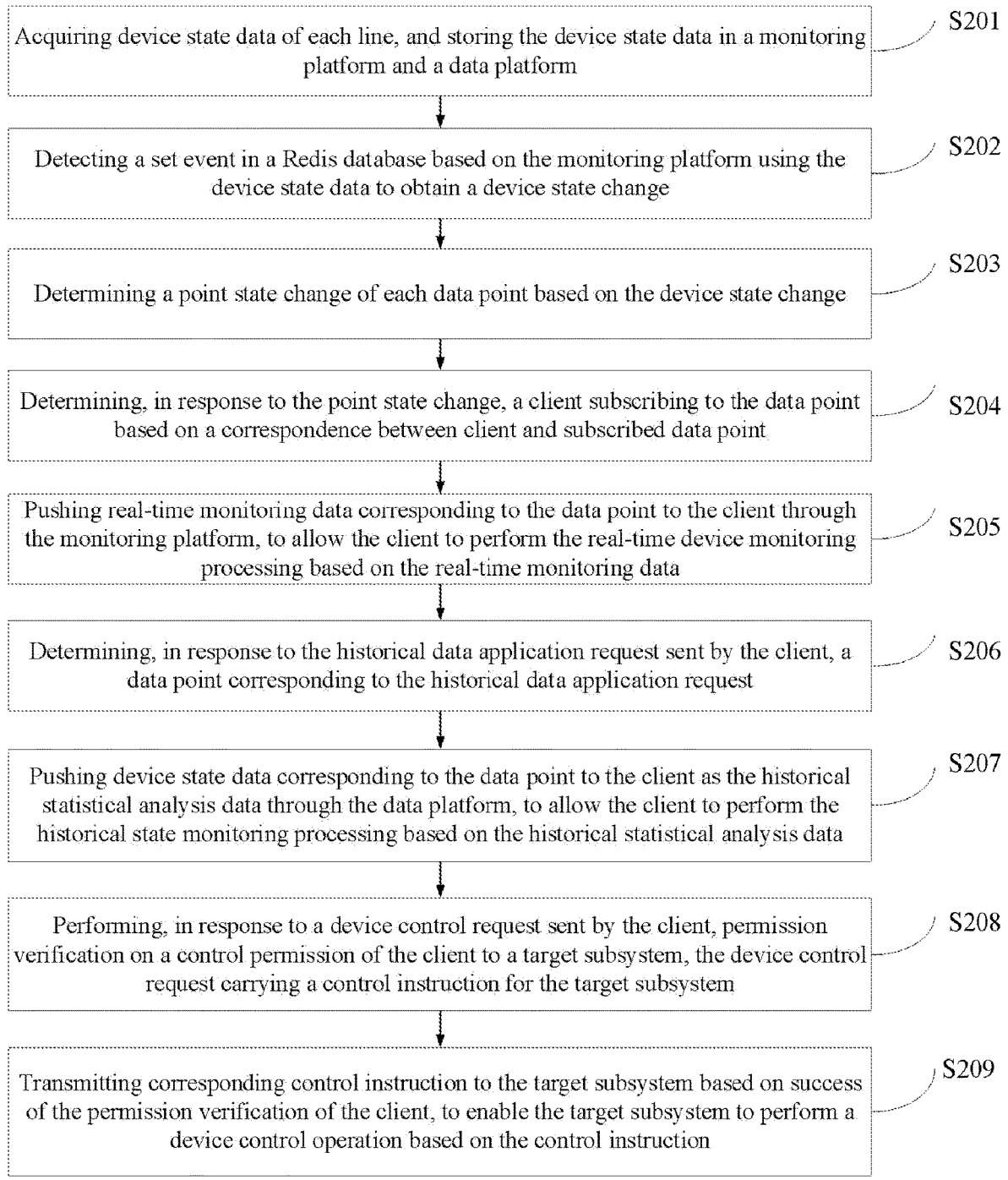
FIG. 6 is another flowchart of a cloud platform-based comprehensive line network monitoring method according to an embodiment of the present disclosure.

On the basis of the above embodiments, FIG. 6 illustrates another flowchart of a cloud platform-based comprehensive line network monitoring method according to an embodiment of the present disclosure. This cloud platform-based comprehensive line network monitoring method embodies the cloud platform-based comprehensive line network monitoring method as described above. Referring to FIG. 6, the cloud platform-based comprehensive line network monitoring method includes actions at S201 to S209.

At S201, device state data of each line is acquired, and stored in a monitoring platform and a data platform.

In some embodiments, for a new line and an existing line, acquisition of the device data by the monitoring platform and the data platform includes actions at block S2011 and block S2012.

At S2011, device state data of the new line is acquired based on the new line in real time via an interface server and stored in a Remote Dictionary Server (Redis) database of the monitoring platform, and device state data at a line center and device state data at a station depot and stabling yard are pushed to the data platform via a message queue service for acquisition and storage.

The device state data includes data of all disciplines integrated or interconnected by the line center and the station depot and stabling yard (a station, a depot, and a stabling yard, the same below).

A central comprehensive monitoring system and a station-level comprehensive monitoring system for the new line according to the embodiments can be constructed to correspond to a PaaS layer of the cloud platform based on the comprehensive line network monitoring system according to the embodiments. The central comprehensive monitoring system and the station-level comprehensive monitoring system can write data into a Kafka message queue to be communicated with the data platform.

In some embodiments, an interface processor of the new line is configured to poll a device state from each station-level integrated and interconnected subsystem using ModBus protocol and generate the device state data (including data point state change, alarm data, and event data). The central interface processor and the station-level interface processor can transmit the acquired data to the central comprehensive monitoring system and the station-level comprehensive monitoring system via the ICE protocol, respectively. The central comprehensive monitoring system and the station-level comprehensive monitoring system can store the device state data into their respective Redis databases based on station and discipline.

Further, the device state data is transmitted to the monitoring platform by the central comprehensive monitoring system and the station-level comprehensive monitoring system via the interface server using the ModBus protocol. The device state data is stored in the Redis database by the monitoring platform based on the station and the discipline. The Redis database can only store the latest device state data.

Also, after the device state data is received by the central comprehensive monitoring system and the station-level comprehensive monitoring system, the device state data is written to a message queue (e.g., Kafka queue) of the data platform by the central comprehensive monitoring system and the station-level comprehensive monitoring system, and then is transmitted to the data platform via the message queue service. The device state data is stored in MPP database by the data platform based on the station and the discipline.

At S2012, device state data of an existing line is acquired via the interface server based on the existing line, and stored in the Redis database of the monitoring platform, and is transmitted to the data platform by the monitoring platform via the message queue service to allow the data platform to acquire and store the device state data of the existing line.

The existing line according to the embodiments may be interpreted as a line that has completed line construction and setup of the comprehensive monitoring system and has been put into service. For the existing line, the interface server is provided at the line center. The interface server is connected to the monitoring platform based on the ICE protocol and to the central comprehensive monitoring system and the station-level comprehensive monitoring system based on the ModBus protocol.

The interface processor of the existing line polls a device state from each station-level integrated and interconnected subsystem using the ModBus protocol and generates device state data (including data point state changes, alarm data, and event data). The central interface processor and the station-level interface processor transmit, via the ICE protocol, the acquired data to the central comprehensive monitoring system and the station-level comprehensive monitoring system, respectively. The central comprehensive monitoring system and the station-level comprehensive monitoring system store the device state data in their respective Redis databases by station and by discipline.

Further, the device state data is transmitted to the monitoring platform by the central comprehensive monitoring system and the station-level comprehensive monitoring system transmit via the interface server using the ModBus protocol. The device state data is stored in the Redis database by the monitoring platform based on the station and the discipline.

Further, the device state data is pushed to the data platform by the monitoring platform via the message queue service to be stored in the MPP database by the data platform based on the station and the discipline.

At S202, a set event in the Redis database is detected by the monitoring platform based on the device state data to obtain device state change.

In some embodiments, the set event in the Redis database is detected by the monitoring platform to determine the device state change. That is, a detection of the set event in the Redis database indicates the device state change corresponding to the device state data.

At S203, point state change of each data point is determined based on the device state change.

In some embodiments, in response to the detection of the set event and the determination of the device state change, the point state change of each data point corresponding to each device is updated based on the point state change corresponding to each device.

At S204, in response to the point state change, a client subscribing to the data point is determined based on a correspondence between the client and the subscribed data point.

In some embodiments, the persistent connection is established between the client and the monitoring platform, and the client subscribes to data point of each to-be-monitored device from the monitoring platform, thereby subscribing to the real-time monitoring data from the monitoring platform. In addition, the correspondence between the client and the subscribed data point.

In some embodiments, each client may update, based on a newly-opened monitoring panel, a device point to be subscribed, and clear previously existing subscriptions and re-subscribe to a new device point during switching of a monitoring page.

In the event of the point state change of the data point, the monitoring platform determines, based on the correspondence between the client and the subscribed data point, the client subscribing to the data point.

At S205, real-time monitoring data corresponding to the data point is pushed to the client through the monitoring platform, to allow the client to perform the real-time device monitoring processing based on the real-time monitoring data.

In some embodiments, after the client that subscribes to the device point with the point state change is determined, real-time monitoring data corresponding to the data point is pushed to the corresponding client, to allow the client to perform the real-time device monitoring processing based on the real-time monitoring data.

At S206, in response to the historical data application request sent by the client, a data point corresponding to the historical data application request is determined.

At S207, device state data corresponding to the data point is pushed to the client as the historical statistical analysis data through the data platform, to allow the client to perform the historical state monitoring processing based on the historical statistical analysis data.

In some embodiments, when a historical state of the device needs to be monitored, the historical data application request may be sent to the data platform based on the time period to be observed and the data point of the target device. After receiving the historical data application request, the data platform determines the time period and the data point corresponding to the historical data application request.

Further, the device state data to be retrieved by the client is determined based on the time period and the data point, and the device state data is pushed to the client as the historical statistical analysis data. The client may perform the historical state monitoring processing based on the received historical statistical analysis data.

At S208, permission verification is performed on a control permission of the client to a target subsystem in response to a device control request sent by the client. The device control request carries a control instruction for the target subsystem.

In some embodiments, when the client needs to control the device, the client may send the device control request to the monitoring platform via the ICE protocol based on the target subsystem where the target device to be controlled is located. The device control request carries the control instruction for the target subsystem. Different clients have different control permissions to different subsystems. Meanwhile, a control permission of each subsystem is recorded by the monitoring platform based on user information of the client.

When receiving the device control request, the monitoring platform verifies whether the client has a control permission to the corresponding subsystem based on the user information logged in at the client. When the permission verification is successful, the method proceeds to S209. Otherwise, the device control request is ignored or a feedback of no control permission is returned.

At S209, corresponding control instruction is transmitted to the target subsystem based on success of the permission verification of the client, to enable the target subsystem to perform a device control operation based on the control instruction.

In some embodiments, forwarding of the control instruction specifically includes actions at S2091 and S2092.

At S2091, a station-level comprehensive monitoring system where the target subsystem is located is determined based on the success of the permission verification of the client.

At S2092, the control instruction is transmitted to the station-level comprehensive monitoring system via the interface server based on the monitoring platform, to enable the station-level comprehensive monitoring system to transmit the control instruction to the target subsystem through a station-level interface processor.

In some embodiments, after the success of the permission verification of the client, the corresponding station-level comprehensive monitoring system is determined by the monitoring platform based on the target subsystem to which the device control request is directed, and a control instruction carried by the device control request is issued to the station-level comprehensive monitoring system via the interface server.

Further, after receiving the control instruction, the station-level comprehensive monitoring system issues the control instruction to the corresponding subsystem through the station-level interface processor. A control operation is performed on the target device by the subsystem based on the control instruction, and a device control result is returned after the control operation is completed.

As described above, the device state data of each line is acquired, and stored in the monitoring platform and the data platform that are built on the cloud platform. Further, the monitoring platform can only store the latest device state data, perform the data monitoring processing on the device state data to obtain the real-time monitoring data, and transmit corresponding real-time monitoring data to the client at an application layer based on the data subscription demand of the client to allow the client to perform the real-time device monitoring processing based on the real-time monitoring data. Also, the data platform can provide, in response to the historical data application request sent by the client, the device state data to the client as the historical statistical analysis data, to allow the client to perform the historical state monitoring processing based on the historical statistical analysis data. Unified processing and storage of the device state data at the line center and the device state data at the station depot and stabling yard can be realized by the monitoring platform and the data platform on the cloud platform, effectively improving resource utilization to facilitate rapid service deployment and expansion, and realizing resource sharing and unified management and control to solve the problem of isolated data island.

The embodiments of the present disclosure are built based on cloud computing resources. A line resource pool and a line network resource pool belong to a same cloud platform. Through unified deployment and bearing of line and line network business applications, dynamic allocation of resources, and unified development, operation, and deployment of an operating environment, computing, storage, on-demand allocation of line network resources, and unified management and centralized monitoring are realized to improve the resource utilization, facilitating rapid deployment and expansion of business, and achieving resource sharing and unified control. Also, the data platform is built relying on the cloud platform to realize acquisition, transmission, governance, storage, security, analysis, management, service, or the like of data shared by respective discipline systems of a metro and achieve comprehensive integration of data from all disciplines. Decoupling of data calculation and services is realized based on capacity construction of the data platform to allow the line and comprehensive line network monitoring system to share a same device state data service, avoiding repeated construction in a conventional mode, realizing an instant access of comprehensive line network monitoring to comprehensive monitoring data of a new line, and ensuring consistency of line and line network data resources. Business application demands of the line comprehensive monitoring system and the comprehensive line network monitoring system can be satisfied through one construction. In this way, a construction cycle is shortened, investment is reduced, and inconsistency of data between different levels of comprehensive monitoring systems is avoided.

Figure 7:
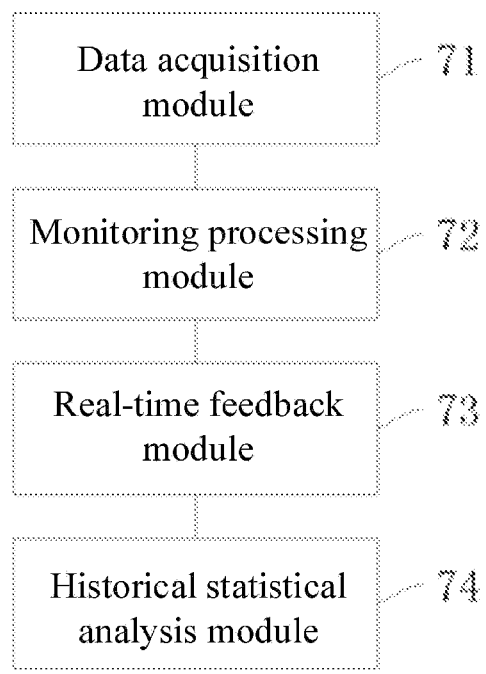
FIG. 7 is a schematic structural view of a cloud platform-based comprehensive line network monitoring apparatus according to an embodiment of the present disclosure.

FIG. 7 illustrates a schematic structural diagram of a cloud platform-based comprehensive line network monitoring apparatus according to an embodiment of the present disclosure. As illustrated in FIG. 7, the cloud platform-based comprehensive line network monitoring apparatus includes a data acquisition module 71, a monitoring processing module 72, a real-time feedback module 73, and a historical statistical analysis module 74.

The data acquisition module 71 is configured to acquire device state data of each line and store the device state data in a monitoring platform and a data platform. The monitoring processing module 72 is configured to perform data monitoring processing on the device state data based on the monitoring platform to obtain real-time monitoring data. The real-time feedback module 73 is configured to provide the real-time monitoring data to a client based on a data subscription demand of the client, to allow the client to perform real-time device monitoring processing based on the real-time monitoring data. The historical statistical analysis module 74 is configured to provide, in response to a historical data application request sent by the client, the device state data to the client as historical statistical analysis data, to allow the client to perform historical state monitoring processing based on the historical statistical analysis data.

As described above, the device state data of each line is acquired, and stored in the monitoring platform and the data platform that are built on the cloud platform. Further, the monitoring platform can only store the latest device state data, perform the data monitoring processing on the device state data to obtain the real-time monitoring data, and transmit corresponding real-time monitoring data to the client at an application layer based on the data subscription demand of the client to allow the client to perform the real-time device monitoring processing based on the real-time monitoring data. Also, the data platform can provide, in response to the historical data application request sent by the client, the device state data to the client as the historical statistical analysis data, to allow the client to perform the historical state monitoring processing based on the historical statistical analysis data. Unified processing and storage of the device state data at the line center and the device state data at the station depot and stabling yard can be realized by the monitoring platform and the data platform on the cloud platform, effectively improving resource utilization to facilitate rapid service deployment and expansion, and realizing resource sharing and unified management and control to solve the problem of isolated data island.

In a possible embodiment, the data acquisition module 71 is specifically configured to: acquire device state data of a new line in real time through an interface server based on the new line, store the device state data of the new line into a Remote Dictionary Server (Redis) database of the monitoring platform, and push device state data of a line center and device state data of a station depot and stabling yard to the data platform via a message queue service for acquisition and storage; and acquire device state data of an existing line via the interface server based on the existing line, store the device state data of the existing line into the Redis database of the monitoring platform, and transmit the device state data of the existing line to the data platform by the monitoring platform via the message queue service, to allow the data platform to acquire and store the device state data of the existing line.

In a possible embodiment, the monitoring processing module 72 is specifically configured to detect a set event in the Redis database by the monitoring platform based on the device state data to obtain device state change.

In a possible embodiment, the real-time feedback module 73 is specifically configured to: determine point state change of each data point based on device state change; determine, in response to the point state change, a client subscribing to the data point based on a correspondence between the client and the subscribed data point; and push real-time monitoring data corresponding to the data point to the client through the monitoring platform, to allow the client to perform the real-time device monitoring processing based on the real-time monitoring data.

In a possible embodiment, the historical statistical analysis module 74 is specifically configured to: determine, in response to the historical data application request sent by the client, a data point corresponding to the historical data application request; and push device state data corresponding to the data point to the client as the historical statistical analysis data through the data platform, to allow the client to perform the historical state monitoring processing based on the historical statistical analysis data.

In a possible embodiment, the apparatus further includes a device control module. The device control module is configured to: perform, in response to a device control request sent by the client, permission verification on a control permission of the client on a target subsystem; and transmit corresponding control instruction to the target subsystem based on success of the permission verification of the client, to enable the target subsystem to perform a device control operation based on the control instruction. The device control request carries a control instruction for the target subsystem.

In a possible embodiment, the device control module transmitting the corresponding control instruction to the target subsystem based on the success of the permission verification of the client specifically includes: determining, based on the success of the permission verification of the client, a station-level comprehensive monitoring system where the target subsystem is located; and transmitting, through an interface server, the control instruction to the station-level comprehensive monitoring system based on the monitoring platform, to enable the station-level comprehensive monitoring system to transmit the control instruction to the target subsystem through a station-level interface processor.

In a possible embodiment, the monitoring platform is configured to provide a monitoring capability service and a discipline agent service. The monitoring capability services includes data aggregation, real-time data processing, data synchronization, device control, alarm processing, event processing, message notification, permission control, and memory database. A data service provided by the data platform includes data aggregation, data analysis, data sharing, statistical analysis, operation and maintenance monitoring, Massive Parallel Processing (MPP) database, Hadoop Database (HBase), and Kafka message queue.

In a possible embodiment, the monitoring platform is further configured to provide an ICE-GateWay service. The ICE-GateWay service is a communication interface between the monitoring capability service and the client.

Figure 8:
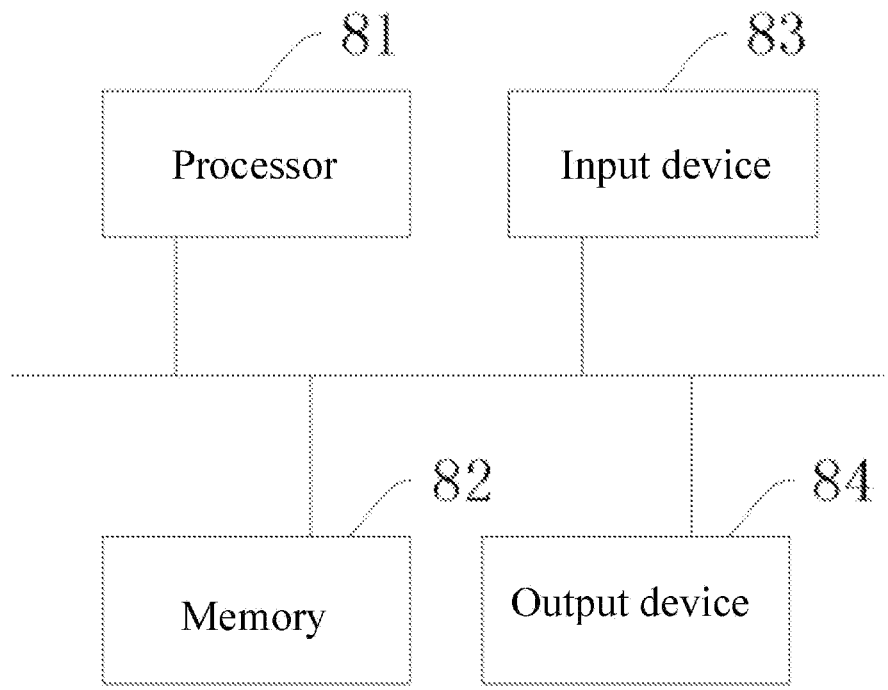
FIG. 8 is a schematic structural view of a computer device according to an embodiment of the present disclosure.

Embodiments of the present disclosure further provide a computer device. The computer device may be integrated in the cloud platform-based comprehensive line network monitoring apparatus according to the embodiments of the present disclosure. FIG. 8 is a schematic structural diagram of a computer device according to an embodiment of the present disclosure. Referring to FIG. 8, the computer device includes an input device 83, an output device 84, a memory 82, and one or more processors 81. The memory 82 is configured to store one or more programs. The one or more programs, when executed by the one or more processor 81, cause the one or more processors 81 to implement the cloud platform-based comprehensive line network monitoring method according to the above embodiments. The input device 83, the output device 84, the memory 82, and the processor 81 may be connected to each other via a bus or in other manners. FIG. 8 is illustrated by establishing the connection via the bus.

As a computing device-readable storage medium, the memory 82 can be configured to store software programs, computer-executable programs, and modules, such as program instructions/modules corresponding to the cloud platform-based comprehensive line network monitoring method according to any of the embodiments (e.g., the data acquisition module 71, the monitoring processing module 72, the real-time feedback module 73, and the historical statistical analysis module 74 of the cloud platform-based comprehensive line network monitoring apparatus). The memory 82 may primarily include a program storage region and a data storage region. An operating system and an application required for at least one function may be stored in the program storage region. Data or the like created according to the use of the device may be stored in the data storage region. In addition, the memory 82 may include a cache random access memory, and may further include a non-volatile memory, such as at least one magnetic disk memory, a flash memory device, or other non-volatile solid-state memory devices. In some embodiments, the memory 82 may further include memories remote from the processor 81. These remote memories may be connected to the device via a network. Examples of the network include, but are not limited to, the Internet, an intranet, a local area network, a mobile communication network, and combinations thereof.

The input device 83 is configured to receive input numeric or character information and generate key signal inputs related to user settings and function control of the device. The output device 84 may include a display device such as a display screen.

The processor 81 is configured to perform various functional applications and data processing of the device, i.e., implement the cloud platform-based comprehensive line network monitoring method described above, by executing software programs, instructions, and modules stored in the memory 82.

The above-mentioned cloud platform-based comprehensive line network monitoring apparatus, device, and computer can each be configured to perform the cloud platform-based comprehensive line network monitoring method according to any of the above embodiments and provide corresponding functions and advantageous effects.

Embodiments of the present disclosure further provide a storage medium containing computer-executable instructions. The computer-executable instructions, when executed by a computer processor, perform the cloud platform-based comprehensive line network monitoring method according to the above embodiments. The cloud platform-based comprehensive line network monitoring method includes: acquiring device state data of each line and storing the device state data in a monitoring platform and a data platform; performing data monitoring processing on the device state data based on the monitoring platform to obtain real-time monitoring data; providing the real-time monitoring data to a client based on a data subscription demand of the client, to allow the client to perform real-time device monitoring processing based on the real-time monitoring data; and providing, in response to a historical data application request sent by the client, the device state data to the client as historical statistical analysis data, to allow the client to perform historical state monitoring processing based on the historical statistical analysis data.

The storage medium may be any of various types of memories or storage devices. The term "storage medium" is intended to include: a mounting medium such as a Compact Disc Read-Only Memory (CD-ROM), a floppy disk, or a magnetic tape device; a computer system memory or a random access memory such as a Dynamic Random Access Memory (DRAM), a Double Data Rate RAM (DDR RAM), a Static RAM (SRAM), an Extended Data Output RAM (EDO RAM), a Rambus RAM, etc.; a non-volatile memory such as a flash memory and a magnetic medium (e.g., a hard disk or an optical storage); and a register or other similar types of memory elements, etc. The storage medium may further include other types of memories or a combination thereof. In addition, the storage medium may be located in a first computer system in which a program is executed, or may be located in a different second computer system connected to the first computer system via a network such as the Internet. The second computer system may provide program instructions to the first computer for execution. The term "storage medium" may include two or more storage media that may reside in different positions (e.g., in different computer systems connected via the network). The storage medium may be configured to store program instructions (e.g., specifically embodied as a computer program) executable by one or more processors.

Of course, for the storage medium containing the computer-executable instructions according to the embodiments of the present disclosure, the computer-executable instructions are not limited to the cloud platform-based comprehensive line network monitoring method described above, and may further perform relevant operations in the cloud platform-based comprehensive line network monitoring method according to any of the above embodiments.

The cloud platform-based comprehensive line network monitoring apparatus, the device, and the storage medium according to the above embodiments can perform the cloud platform-based comprehensive line network monitoring method according to any of the embodiments of the present disclosure, and the detailed description thereof. For technical details not described in the above embodiments, reference may be made to the cloud platform-based comprehensive line network monitoring method according to any of the embodiments of the present disclosure.

The above are merely preferred embodiments and technical principles applied in the present disclosure. Those skilled in the art should understand that, the present disclosure is not limited to the specific embodiments described herein, and various changes, readjustments, and alternatives can be made by those skilled in the art without departing from the scope of the present disclosure. Therefore, although the present disclosure has been described in detail by the above embodiments, the present disclosure is not limited to the above embodiments, and more other equivalent embodiments may be included without departing from the concept of the present disclosure. The scope of the present disclosure is defined by the scope of the appended claims.

What is claimed is:

1. A cloud platform-based comprehensive line network monitoring method, comprising:

acquiring device state data of each line and storing the device state data in a monitoring platform and a data platform, said acquiring the device state data of each line and storing the device state data in the monitoring platform and the data platform comprising:

acquiring, based on a new line, device state data of the new line in real time via an interface server, storing the device state data of the new line into a Remote Dictionary Server (Redis) database of the monitoring platform, and pushing device state data of a line center and device state data of a station depot and stabling yard to the data platform via a message queue service for acquisition and storage; and acquiring, based on an existing line, device state data of the existing line via the interface server, storing the device state data of the existing line into the Redis database of the monitoring platform, and transmitting the device state data of the existing line to the data platform by the monitoring platform via the message queue service, to allow the data platform to acquire and store the device state data of the existing line;

performing data monitoring processing on the device state data based on the monitoring platform to obtain real-time monitoring data;

providing the real-time monitoring data to a client based on a data subscription demand of the client, to allow the client to perform real-time device monitoring processing based on the real-time monitoring data; and providing, in response to a historical data application request sent by the client, the device state data to the client as historical statistical analysis data, to allow the client to perform historical state monitoring processing based on the historical statistical analysis data.

2. The cloud platform-based comprehensive line network monitoring method according to claim 1, wherein said performing data monitoring processing on the device state data based on the monitoring platform to obtain the real-time monitoring data comprises:

detecting a set event in a Remote Dictionary Server (Redis) database based on the monitoring platform based on the device state data to obtain a device state change.

3. The cloud platform-based comprehensive line network monitoring method according to claim 1, wherein said providing the real-time monitoring data to the client based on the data subscription demand of the client, to allow the client to perform the real-time device monitoring processing based on the real-time monitoring data comprises:

determining point state change of each data point based on device state change;

determining, in response to the point state change, a client subscribing to the data point based on a correspondence between the client and the subscribed data point; and pushing real-time monitoring data corresponding to the data point to the client through the monitoring platform, to allow the client to perform the real-time device monitoring processing based on the real-time monitoring data.

4. The cloud platform-based comprehensive line network monitoring method according to claim 1, wherein said providing, in response to the historical data application request sent by the client, the device state data to the client as the historical statistical analysis data, to allow the client to perform the historical state monitoring processing based on the historical statistical analysis data comprises:

determining, in response to the historical data application request sent by the client, a data point corresponding to the historical data application request; and pushing device state data corresponding to the data point to the client as the historical statistical analysis data through the data platform, to allow the client to perform the historical state monitoring processing based on the historical statistical analysis data.

5. The cloud platform-based comprehensive line network monitoring method according to claim 1, further comprising, subsequent to acquiring the device state data of each line and storing the device state data in the monitoring platform and the data platform:

performing, in response to a device control request sent by the client, permission verification on a control permission of the client on a target subsystem, the device control request carrying a control instruction for the target subsystem; and transmitting corresponding control instruction to the target subsystem based on success of the permission verification of the client, to enable the target subsystem to perform a device control operation based on the control instruction.

6. The cloud platform-based comprehensive line network monitoring method according to claim 5, wherein said transmitting the corresponding control instruction to the target subsystem based on the success of the permission verification of the client comprises:

determining, based on the success of the permission verification of the client, a station-level comprehensive monitoring system where the target subsystem is located; and transmitting, via an interface server, the control instruction to the station-level comprehensive monitoring system based on the monitoring platform, to enable the station-level comprehensive monitoring system to transmit the control instruction to the target subsystem through a station level interface processor.

7. The cloud platform-based comprehensive line network monitoring method according to claim 1, wherein:

the monitoring platform is configured to provide monitoring capability services and a discipline agent services, the monitoring capability services comprising data aggregation, real time data processing, data synchronization, device control, alarm processing, event processing, message notification, permission control, and memory database; and data services provided by the data platform comprise data aggregation, data analysis, data sharing, statistical analysis, operation and maintenance monitoring, Massive Parallel Processing (MPP) database, Hadoop Database (HBase), and Kafka message queue.

8. The cloud platform-based comprehensive line network monitoring method according to claim 7, wherein the monitoring platform is further configured to provide an ICE-GateWay service, the ICE-GateWay service being a communication interface between the monitoring capability service and the client.

9. A non-transitory storage medium, comprising computer-executable instructions, wherein the computer-executable instructions, when executed by a computer processor, perform the cloud platform-based comprehensive line network monitoring method according to claim 1.

10. A cloud platform-based comprehensive line network monitoring system, comprising:

a monitoring, platform and a data platform that are provided on a cloud platform;

a line network-level monitoring system provided at a line network center;
a newly-added central-level system provided at a line center; and
a newly-added station-level system provided at a station, depot and stabling yard, wherein:
each of the line network-level monitoring system, the newly-added central-level system, and the newly-added station-level system is communicatively connected to the monitoring platform and the data platform;
device state data of the line center is acquired by a central comprehensive monitoring system via a central interface processor; device state data of the station depot and stabling yard is acquired by a station-level comprehensive monitoring system via a station-level interface processor, wherein an interface server is provided at the line center, each of the central comprehensive monitoring system and the station-level comprehensive monitoring system is communicatively connected to the monitoring platform via the interface server;
for a new line, device state data of the central comprehensive monitoring system and the station-level comprehensive monitoring system is acquired by the monitoring platform via the interface server, and is stored into a Remote Dictionary Server (Redis) database of the monitoring platform, and the acquired device state data is pushed to a message queue of the data platform by the central comprehensive monitoring system and the station-level comprehensive monitoring system via a message queue service for acquisition and storage;
for an existing line, the device state data of the central comprehensive monitoring system and the station-level comprehensive monitoring system is acquired by the monitoring platform via the interface server, and is stored into the Redis database of the monitoring platform, and the device state data is transmitted to the data platform by the monitoring platform via the message queue service to allow the data platform to acquire and store the device state data;
the monitoring platform is configured to: acquire and store the device state data and perform a data monitoring processing on the device state data to obtain real-time monitoring data; and provide the real-time monitoring data to a client based on a data subscription demand of the client to allow the client to perform real-time device monitoring processing based on the real-time monitoring data; and
the data platform is configured to provide, in response to a historical data application request sent by the client, the device state data to the client as historical statistical analysis data to allow the client to perform historical state monitoring processing based on the historical statistical analysis data.

11. A computer device, comprising:
a memory having one or more programs stored thereon; and
one or more processors,
wherein the one or more programs, when executed by the one or more processors, cause the one or more processors to:
acquire device state data of each line and storing the device state data in a monitoring platform and a data platform, wherein said acquiring the device state data of each line and storing the device state data in the monitoring platform and the data platform comprises:
acquiring, based on a new line, device state data of the new line in real time via an interface server, storing the device state data of the new line into a Remote Dictionary Server (Redis) database of the monitoring platform, and pushing device state data of a line center and device state data of a station depot and stabling yard to the data platform via a message queue service for acquisition and storage; and
acquiring, based on an existing line, device state data of the existing line via the interface server, storing the device state data of the existing line into the Redis database of the monitoring platform, and transmitting the device state data of the existing line to the data platform by the monitoring platform via the message queue service, to allow the data platform to acquire and store the device state data of the existing line;
perform data monitoring processing on the device state data based on the monitoring platform to obtain real-time monitoring data;
provide the real-time monitoring data to a client based on a data subscription demand of the client, to allow the client to perform real-time device monitoring processing based on the real-time monitoring data; and
provide, in response to a historical data application request sent by the client, the device state data to the client as historical statistical analysis data, to allow the client to perform historical state monitoring, processing based on the historical statistical analysis data.

12. The computer device according to claim 11, wherein said performing data monitoring processing on the device state data based on the monitoring platform to obtain the real-time monitoring data comprises:
detecting a set event in a Remote Dictionary Server (Redis) database based on the monitoring platform based on the device state data to obtain a device state change.

13. The computer device according to claim 11, wherein said providing the real-time monitoring data to the client based on the data subscription demand of the client, to allow the client to perform the real-time device monitoring processing based on the real-time monitoring data comprises:
determining point state change of each data point based on device state change;
determining, in response to the point state change, a client subscribing to the data point based on a correspondence between the client and the subscribed data point; and
pushing real-time monitoring data corresponding to the data point to the client through the monitoring platform, to allow the client to perform the real-time device monitoring processing based on the real-time monitoring data.

14. The computer device according to claim 11, wherein said providing, in response to the historical data application request sent by the client, the device state data to the client as the historical statistical analysis data, to allow the client to perform the historical state monitoring processing based on the historical statistical analysis data comprises:
determining, in response to the historical data application request sent by the client, a data point corresponding to the historical data application request; and
pushing device state data corresponding to the data point to the client as the historical statistical analysis data through the data platform, to allow the client to perform the historical state monitoring processing based on the historical statistical analysis data.

15. The computer device according to claim 11, wherein the one or more programs, when executed by the one or more processors, further cause the one or more processors to, subsequent to acquiring the device state data of each line and storing the device state data in the monitoring platform and the data platform:
- performing, in response to a device control request sent by the client, permission verification on a control permission of the client on a target subsystem, the device control request carrying a control instruction for the target subsystem; and
- transmitting corresponding control instruction to the target subsystem based on success of the permission verification of the client, to enable the target subsystem to perform a device control operation based on the control instruction.

16. The computer device according to claim 15, wherein said transmitting the corresponding control instruction to the target subsystem based on the success of the permission verification of the client comprises:
- determining, based on the success of the permission verification of the client, a station-level comprehensive monitoring system where the target subsystem is located; and
- transmitting, via an interface server, the control instruction to the station-level comprehensive monitoring system based on the monitoring platform, to enable the station-level comprehensive monitoring system to transmit the control instruction to the target subsystem through a station-level interlace processor.

17. The computer device according to claim 11, wherein:

the monitoring platform is configured to provide monitoring capability services and a discipline agent services, the monitoring capability services comprising data aggregation, real-time data processing, data synchronization, device control, alarm processing, event processing, message notification, permission control, and memory database; and data services provided by the data platform comprise data aggregation, data analysis, data sharing, statistical analysis, operation and maintenance monitoring, Massive Parallel Processing (MPP) database, Hadoop Database (HBase), and Kafka message queue.

* * * * *